Feb. 13, 1962    B. BARÉNYI    3,021,171
ALL-PURPOSE PASSENGER CAR
Filed Aug. 4, 1959    4 Sheets-Sheet 3
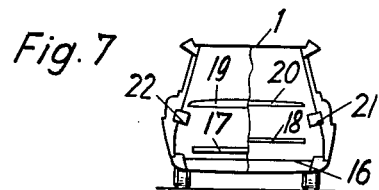
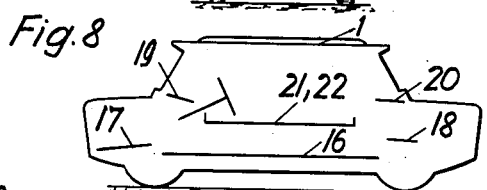
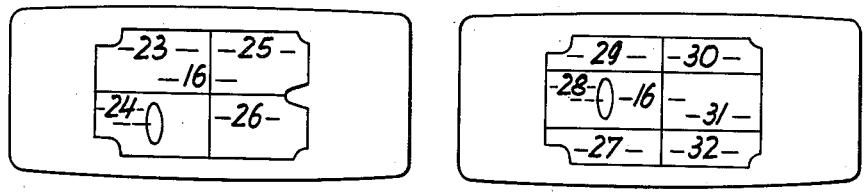
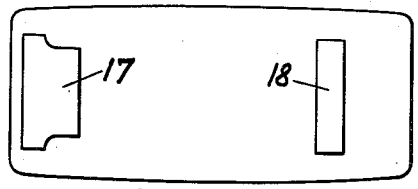
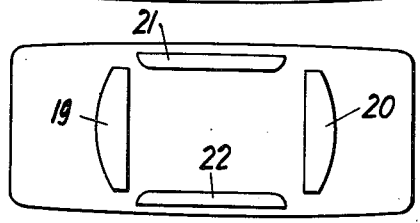
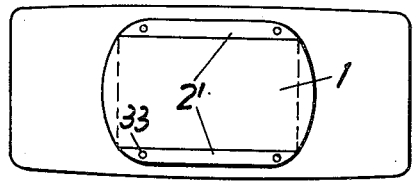
INVENTOR.
BÉLA BARÉNYI
BY
Dickes, Craig and Freudenberg
ATTORNEYS INVENTOR.
BÉLA BARÉNYI
BY
Dicke, Craig and Freudenberg
ATTORNEYS

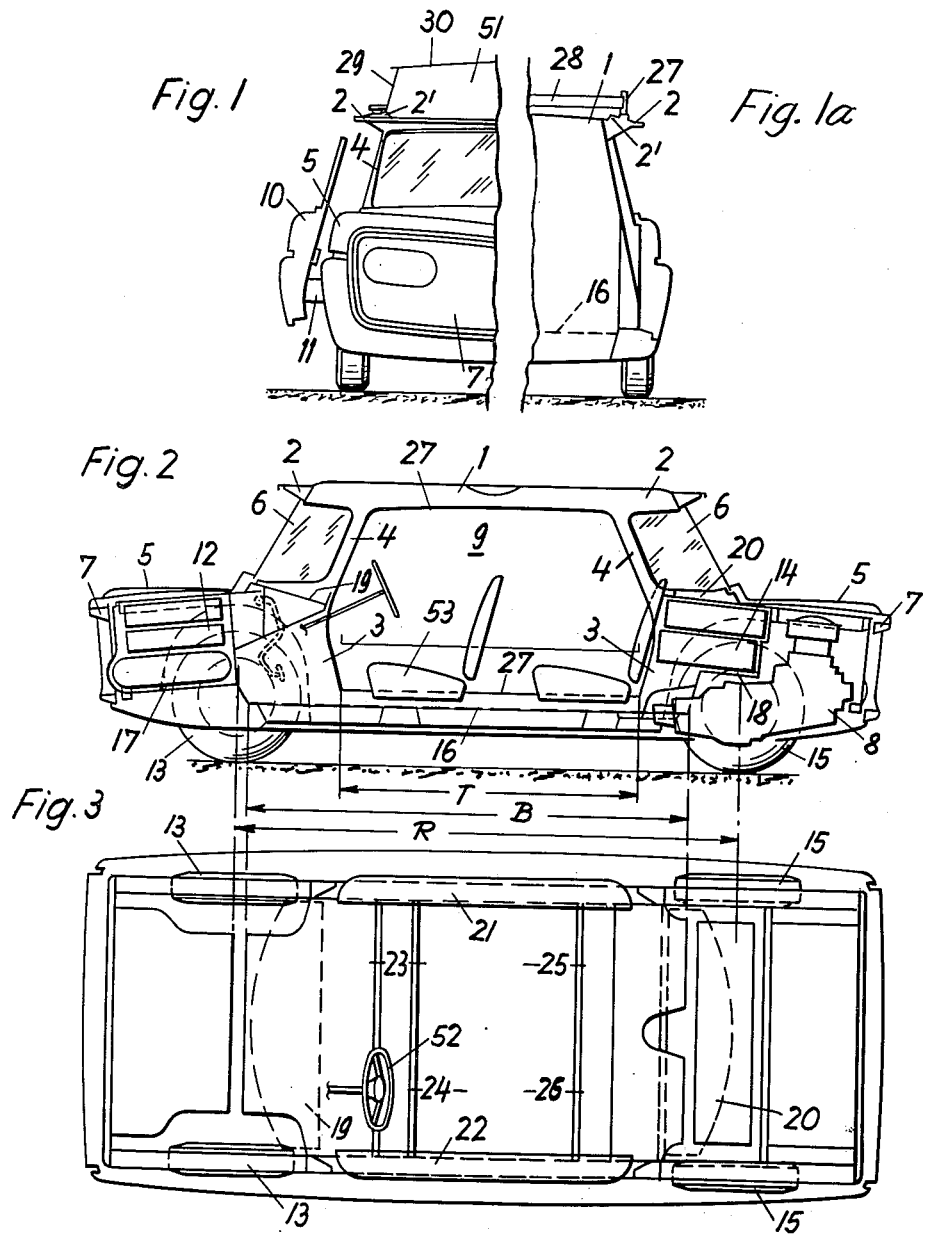

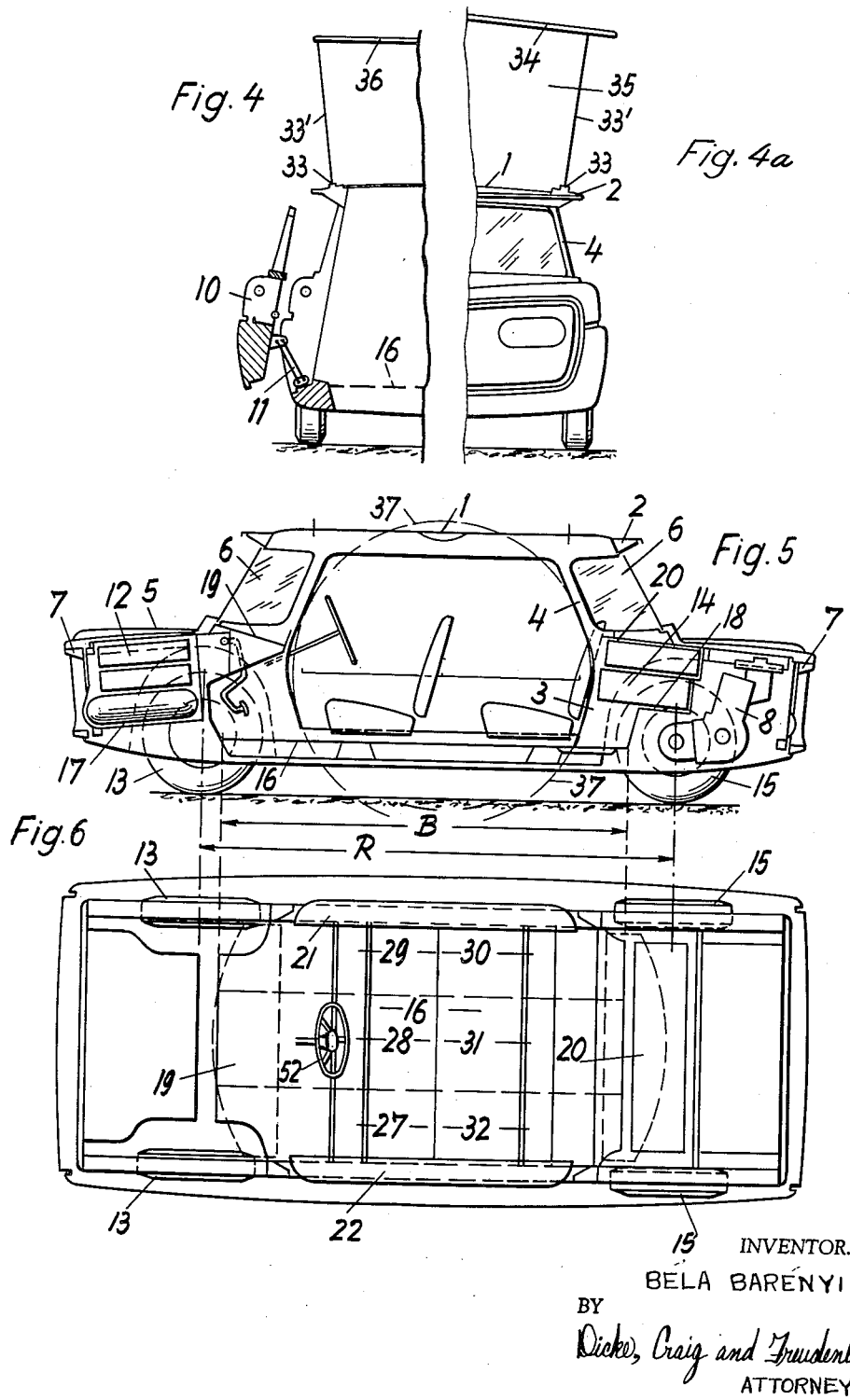

United States Patent Office 3,021,171
Patented Feb. 13, 1962

3,021,171
ALL-PURPOSE PASSENGER CAR
Béla Barényi, Stuttgart-Vaihingen, Germany, assignor to Daimler-Benz Aktiengesellschaft, Stuttgart-Unterturkheim, Germany
Filed Aug. 4, 1959, Ser. No. 831,621
Claims priority, application Germany Aug. 4, 1958
27 Claims. (Cl. 296—24)

The present invention relates to a new design and construction of a passenger automobile, and it is the principal object of the invention to provide an all-purpose vehicle of a generally new design which permits a maximum utilization of the area contained within the outer contours of the automobile. More specifically, it is an object of the invention to provide an automobile with the largest possible inner payload capacity commensurate with its size and a pleasing inner and outer design, and also with large outer load-carrying surfaces for the transportation of additional loads. The car is accordingly designed to be used both for commercial and private purposes for carrying the maximum amount of goods of any kind and to permit their storage in the most economic manner. It may also be used for camping purposes and be provided with sleeping accommodations, and it affords a greater area for carrying suit-cases and lighter goods of any kind, as well as ample space for storing smaller articles which should be within easy reach of the driver and his passengers at any time.

In order to attain these objects, the present invention provides a passenger car which complies with the requirements of having, first, a flat or only slightly arched roof, the edges of which project at least over the sides of the car body; second, a door opening which extends substantially along the entire length of the interior or passenger compartment of the car and is preferably closed by a sliding door; third, an engine which is preferably mounted substantially within an area outside of the area of the wheel base; fourth, removable seats; and, fifth, an upper body the front and rear parts of which at both sides of the center of its length are preferably substantially symmetrical.

Aside from complying with these basic requirements, it is a further object of the invention to provide a car which is characterized by a combination of the following features:

(a) A car top which is adapted for directly supporting a considerable load;
(b) A floor space at the inside of the vehicle which may be used in its entirety for load-carrying, sleeping, and other purposes;
(c) A door opening at one or both sides of the car which is closed by one or more doors, preferably by a single sliding door, and extends symmetrically from the vertical center of the total length of the car in both directions to the upwardly projecting frame supporting the car top;
(d) A substantially flat floor area of the vehicle for storing and transporting loads composed of the entire surface of the car top and the entire surface of the floor of the car interior, and amounting to approximately two-thirds of the entire area within the outer contours of the car as seen in a plan view thereof.

The present invention further relates to a passenger car which is normally provided with two rows of seats, and it is another feature of the invention that these seats are removable and that, when one, several, or all of the individual seats or bench seats are removed, a substantially level floor surface will be attained, and that each floor portion thus attained for load-carrying purposes corresponds to the floor space required for the respective individual seat or bench seat.

In the event that the passenger car is to be equipped with a central steering column, the invention provides an embodiment in which one, several, or all of the seats are removable, and in which the substantially level floor space attainable when all of the seats are removed is preferably divisable into six equal floor sections.

According to another feature of the invention, the floor space adapted to be loaded may consist of interchangeable floor boards or plates of a size of the individual floor sections and preferably consisting of plywood, plastic, light metal, or the like. In place of such boards, it is, however, also possible to utilize duckboards which may be rolled up or corrugated boards which cover the level floor surface or the sections thereof.

These floor boards are preferably provided in a number, size and shape so as to cover the entire floor space of the car interior and to result in a flat, horizontal surface suitable for load-carrying purposes.

In addition to the entire floor space of the car interior which is adapted to carry loads of any kind, the invention further provides that the inner walls of the car and preferably the doors are equipped with shelf surfaces or repositories of a length substantially equal to the total length of the door and preferably of a troughlike shape. The area of these repositories may be further increased by additional shelving underneath the windshield and/or the rear window, similarly as provided in many conventional cars. In passenger cars with a rear engine, additional surfaces for storing suitcases and the like may also be provided in the conventional manner in front of and above the front axle and also above the rear axle.

It is therefore an important feature of the present invention to provide a passenger car in which the total usable surface area of the substantially flat car top, of the floor space of the interior of the car, and of the repositories at the front and rear windows and on or in the two side walls of the car substantially corresponds to the total surface area of the car as seen in a plan view.

The passenger car according to the present invention is further equipped with an upper body of a particular design and construction according to which the lateral door opening of the car, which may preferably be closed by a sliding door, has a shape substantially of a circle which is cut down by two horizontal secants extending along the level of the lower edge of the car top and along the level of the upper edge of the door sill and having a diameter substantially equal to two-thirds of the length of the wheel base.

The sectional floor boards, duckboards or the like as previously mentioned which, either singly or together, are adapted to cover the floor of the car interior and then form a level loading surface, may, according to another feature of the invention, be joined together to form a larger section. It is thus possible to provide various combinations of such floor boards or floor board sections in accordance with the particular position, size or shape in which they may be needed. Thus, for example, two or more individual rigid boards or duckboards or the like which may be rolled up may be combined to form a larger section which preferably covers the rear half of the floor of the car interior. Two of these larger board sections are preferably sufficient to cover the entire floor space. If the floor space of the car interior is divided into four sections, one or more sectional boards may be provided of a length equal to the length of the floor and of a width sufficient to cover one-half of the floor. If, however, the floor space of the car interior is divided into six sections, the board sections may also have a length equal to the entire length of the floor, but each of them should be adapted to cover one-third of the entire floor space. The floor boards should, however, be designed so as also to permit the entire extent of the floor of the car to be covered.

The floor boards, duckboards or the like are preferably supported by projections on the upper surface of the car floor. These projections may be supplemented by further projections on the front and rear wall portions of the floor near the wheels. The floor boards may be further supported by horizontal transverse strips, sills or the like which may be secured to or integral with the floor and/or the car frame.

A further feature of the invention consists in providing the substantially flat car top with outwardly projecting edge portions of a triangular cross section, and in the provision of means such as sockets, eyes, projections, or the like for securing different kinds of loads on the car top.

All of the above-mentioned features combined with each other result in an all-purpose vehicle which may be utilized in numerous ways. Thus, for example, it may be used as a taxi cab since it will accommodate a relatively large number of passengers and also permit the storage of a considerable amount of baggage which may also be of a large size. The special size, shape and construction of the door and of the loading surface or surfaces also render the vehicle according to the invention especially useful as a van for transporting light and bulky goods and even relatively large furniture, or as a substitute for a station wagon or truck for commercial purposes of smaller and medium businesses, for example, for farms, vegetable stores, flower stores and the like, for repair shops, for carrying out deliveries and innumerable other purposes. In short, while retaining the more streamlined shape of a passenger car, as well as all of the conveniences thereof, it has all of the advantages of a station wagon. It is for this reason also the ideal car for salesmen who have to carry out their own deliveries of smaller and medium-sized items or have to take along a larger number of samples to show to their customers.

The passenger car according to the invention is furthermore very useful as a police car, as a first-aid or emergency car, even as an ambulance or a physician's car; it is excellent for use in expeditions, as well as for traveling and camping, and as a beach car. Furthermore, it may be used for transporting bulky sport articles such as boats, sleds, and the like, as a car for hunting, for tours, or propaganda purposes, or for reporters and photographers who have to take along a considerable amount of equipment, or as a traveling or emergency repair shop. It is also especially adapted to be used as a military vehicle for many different purposes both in peace and war time and even in combat, as a staff car, reconnaissance car, signal corps car, ammunition supply car, etc.

All of these and still further objects, features, and advantages will become more apparent from the following detailed description of several embodiments of the invention, particularly when read with reference to the accompanying drawings, in which for the sake of clearness, the outer walls have been indicated as if they were transparent, and in which—

FIGURE 1 is a partial front view of one embodiment of a passenger car according to the present invention;

FIGURE 1a is a partial transverse cross-sectional view of another embodiment;

FIGURES 2 and 3 show, partly in cross-section, side and bottom views, respectively, of an embodiment similar to that shown in FIGURES 1 and 1a but without the details of the roof structure shown in those figures;

FIGURE 4 is a partial transverse cross-sectional view of another embodiment;

FIGURE 4a is a partial front view of a further embodiment of the present invention;

FIGURES 5 and 6 show views similar to those of FIGURES 2 and 3;

FIGURES 7 to 13 illustrate diagrammatically on a scale smaller than that of FIGURES 1 to 6 the arrangement of the loading surfaces and repositories of a car according to the invention;

Figure 14:
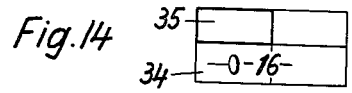

FIGURES 14 to 18 illustrate diagrammatically and on a still smaller scale five different possibilities of designing the load-supporting floor space of the car interior when the floor is divided into four equal sections, for example, if the car is equipped with a left-hand or right-hand drive, respectively; while FIGURES 19 to 28 illustrate similarly to FIGURES 14 to 18 ten different possibilities of designing the load-supporting floor space of the car interior when the floor is divided into six sections, for example, if the car is equipped with a central drive.

The passenger car to which the improvements according to the present invention are applied is preferably a so-called fully symmetrical car, that is, one in which the front and rear parts at both sides of the center of its length are symmetrical to each other. Those parts of the car which are of a similar shape or fulfill the same functions in the various embodiments illustrated in the drawings are identified by the same reference numerals. In all of the embodiments, the car top 1 is of a substantially flat or only slightly arched shape and disposed substantially horizontally. Car top 1 projects over the other parts of the upper car body and thus forms overlapping edge portions 2 which have a substantially triangular cross section. Car top 1 is supported by the upwardly extending parts 3 of the upper frame and by the door posts 4 which together with the lower edge of the car top and the edge portions of the shelves 19 and 20 form frames for the curved windshield and rear window 6. The front and rear hoods 5 together with other parts of the body cover and surround the front and rear end portions 7 of the car. In FIGURES 1 to 6 of the drawings, the car according to the invention has been illustrated as being driven by a rear engine 8, although obviously the engine could also be mounted in front. The interior of the car, generally indicated at 9, may be closed at both sides by sliding doors 10. Each of these doors 10 is connected to the other parts of the body and the upper frame by a connecting element which may be, for example, of a parallelogram shape. It may be opened by first being moved outwardly from the car body and out of the door opening and by then being shifted either forwardly or rearwardly along the car body in a direction substantially parallel to the longitudinal axis of the vehicle.

The front and rear ends of all embodiments of the car according to the invention are provided with trunk compartments 12 and 14. The front trunk compartment 12 lies above and in front of the axle of the front wheels 13, while the rear trunk compartment 14 lies substantially above the axle of the rear wheels 15.

The floor 16 of the car interior 9 may be fully utilized in all embodiments of the invention for carrying loads. The forward extension of floor 16 forms the bottom 17 of the front trunk compartment 12 on which suitcases, a spare tire and the like may be supported, while the rear extension of floor 16 forms the bottom 18 of the rear trunk compartment. Smaller items may also be deposited on the shelf surfaces 19 and 20 underneath the front and rear windows 6 and extending across the entire width thereof. Further shelf surfaces or repositories 21 and 22 extending in the longitudinal direction of the car are provided within the doors 10 to which they are secured.

In the embodiments of the invention as shown in FIGURES 1 to 3, the car has a floor space of a maximum length B, as indicated in FIGURE 2. This floor space is divided into four sections 23, 24, 25, and 26 which may be covered individually with floor boards consisting of plywood, plastic, light metal or the like or with duckboards or the like which are adapted to be rolled up. These sections 23, 24, 25, and 26 may be used alternately either for supporting different kinds of loads or for mounting seats thereon.

The upper surface of the car top 1 according to FIGURES 1 to 3 is provided on the lateral sides of its overlapping edge portions 2 with upwardly projecting ridges 2', as shown in FIGURES 1 and 1a, and the projecting edge portions 2 themselves are provided near their longitudinal ends with socketlike apertures or upwardly projecting sockets or the like for the insertion of rods 27 which, if desired, may be connected by transverse rods 28 or the like, as indicated in FIGURE 1a, to form a rack on which long articles such as pipes, long pieces of furniture, boats or the like may be supported. FIGURE 1 illustrates a low top compartment 51 which may be removably mounted on the car top 1, in which event the side and end walls 29 may be secured in the sockets or the like on the projecting edge portions 2. This additional compartment 51 may be provided with a top 30 of its own.

In FIGURE 1, the left sliding door 10 is shown in the opened position when it is shifted either forwardly or rearwardly of the door opening. In FIGURE 2, the door has been omitted so that the full extent of the door opening will be visible which is indicated by a heavy line at 27. The lower edge of the door opening 27 as well as of the door 10 has a length T. The wheel base of the car is indicated in FIGURES 2 and 5 by R.

The steering wheel 52 is indicated in FIGURE 3 as being mounted at the left side within the area of the floor section 24. Consequently, this floor section 24 cannot be used as a surface on which any goods may be stored and transported but, at least while the car is being driven, it will carry a driver's seat 53. This seat 53 is, however, removable like all the other seats, for example, for camping purposes if the entire floor space is to be used for sleeping thereon. All the other floor sections 23, 25, and 26 may, however, be alternately used either as loading surfaces or mounting surfaces, or for supporting other seats. The other loading surfaces, as previously mentioned, consist of the car top 1, the floors 17 and 18 of the front and rear trunk compartments 12 and 14, the front and rear window shelves 19 and 20, and the lateral shelves 21 and 22 on the sliding doors 10.

The total level area consisting of the car top and the floor of the car interior alone amounts to about two-thirds of the surface area of the entire car as seen in a plan view. This already constitutes a greater loading area than has previously been attained in passenger cars. This loading area is, however, further increased by the additional loading surfaces or repositories, namely, the front and rear window shelves, the long shelves on or in the two sliding doors, and the two trunk compartments. Thus, the total of all the available surfaces which may be used for storing or transporting of goods corresponds at least to the total area of the vehicle, as seen in a plan view.

FIGURES 4 to 6 illustrate further embodiments of the passenger car according to the invention. These embodiments are illustrated in cars of a medium size and provided with a central steering wheel 52. The floor space is preferably divided into six floor sections 27, 28, 29, 30, 31, and 32, as indicated in FIGURE 6. Floor section 28 lies underneath steering wheel 52 and is therefore occupied by a driver's seat and not usable for other loading purposes.

FIGURE 4a illustrates a tent or sleeping compartment 35 for camping purposes. The projecting edge portions 2 of the car top are again provided with sockets or the like 33 into which rods 33' are inserted which support the roof 34 of the sleeping compartment 35. FIGURE 4 shows a variation in which the rods 33' support a railing 36 which surrounds the entire area above the car top approximately at the height of the hips of a grown-up person. This modification may be used, for example, as a terrace, as a hunting stand, as a gallery for watching sport events, as a stand for taking motion pictures, etc.

FIGURE 5 indicates the size of the door opening by means of a circle 37, shown in dotted lines, the diameter of which corresponds substantially to two-thirds of the size of the wheel base R. The upwardly projecting parts 3 of the frame and the door posts 4 supporting the car top form tangents of this circle 37.

FIGURES 7 to 13 omit all structural details of the car according to the invention and are merely intended to indicate the position and size of the individual loading surfaces of the car. FIGURES 7, 8 and 11 to 13 show the loading surfaces generally according to the embodiments shown in the previous figures.

FIGURE 7 shows the car according to the invention in a cross section taken in a vertical direction and transverse to the longitudinal direction in such a manner that not only the surface 1 of the car top is visible which may be used for directly supporting various loads but also the shelf surfaces 19 and 20 underneath the front and rear windows, the lateral shelf surfaces or repositories 21 and 22, the bottom surfaces 17 and 18 of the front and rear trunk compartments, and the load-supporting floor space 16. FIGURE 8 shows a vertical section taken in the longitudinal axial direction of the car and also illustrates all of the load-supporting surfaces 1, 16, 17, 18, 19, 20, 21, and 22.

FIGURE 9 shows the division of the floor space 16 according to the embodiment shown in FIGURES 2 and 3, while FIGURE 10 shows the division of the floor space 16 according to the embodiment shown in FIGURES 5 and 6.

FIGURE 11 only illustrates the bottom surfaces 17 and 18 of the two trunk compartments for supporting a spare tire, suitcases and the like. The bottom surface 17 of the front trunk compartment is laterally offset to provide for the inner fender walls, and the size of the bottom surface 18 of the rear trunk compartment is determined by the dimensions of the rear engine.

FIGURE 12 illustrates all of the shelf spaces or repositories for an occasional depositing of articles which should be within easy reach, namely, the two lateral trough-shaped shelves 21 and 22 mounted on or within the sliding doors and extending in the longitudinal direction of the car, and the two shelf surfaces 19 and 20 directly underneath the front and rear windows.

FIGURE 13 illustrates the surface 1 of the car top which may be used for directly supporting different loads, and the two lateral edge portions 2' which are raised above the load-supporting surface 1, as shown in FIGURE 1 or 1a and thus form rims to prevent the loads on the car top from sliding off laterally. Obviously, these raised portions 2' may also be extended transversely, for example, as indicated in FIGURE 13 in dotted lines. Near the front and rear ends of these lateral portions 2', the same are provided with sockets, apertures or the like 33 for the insertion of individual rods or the legs of a railing as previously described with regard to FIGURES 1 and 6.

Figure 15:
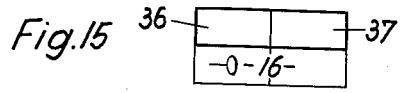
Figure 16:
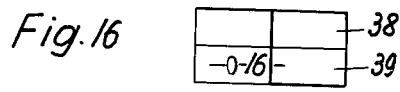

Depending upon the particular purpose for which the car is to be used, the floor space 16 at the inside of the car may be partly or fully covered with sectional floor boards of plywood, plastic, light metal, or the like or with duckboards consisting of interconnected slats or boards or corrugated plates which may be rolled up. The floor sections which are thus to be covered may be varied in the manner as illustrated in FIGURES 14 to 18. FIGURE 14 shows a loading area 35 next to the area 34 in which the driver's seat is mounted. FIGURE 15 shows two floor sections behind each other which are covered with such floor boards 36 and 37 or the like and thus result in a loading area which extends along the entire length of floor 16. The two sectional boards 36 and 37 may also be combined into a single board. The same applies to the two sectional boards 38 and 39 shown in FIGURE 16 which are disposed side-by-side and cover the rear half of the floor space for use as a loading area.

Figure 17:
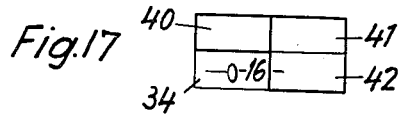
Figure 18:
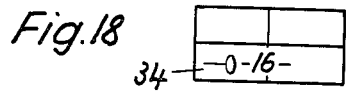

FIGURE 17 shows another variation in which the entire floor space except the driver's area 34 is converted into a loading area by sectional boards 40, 41, and 42. FIGURE 18 finally shows the entire floor space including the driver's area covered by sectional floor boards, that is, either by four individual sections or by two full-length sections. This embodiment may be used, for example, for camping purposes if the entire floor space is to be used for sleeping thereon.

Figure 19:
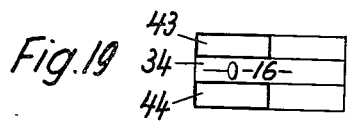
Figure 20:
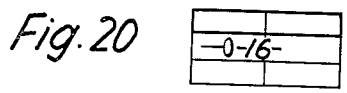
Figure 21:
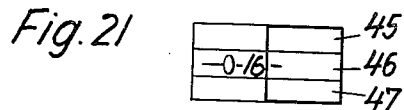
Figure 22:
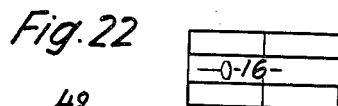
Figures 23, 25:
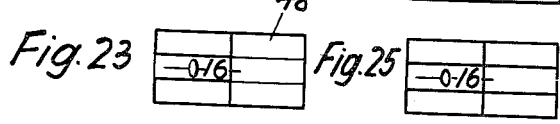
Figure 27:
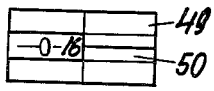
Figures 24, 26:
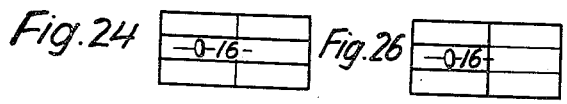
Figure 28:

Similar variations of dividing the available floor space 16 into six sections for use as a loading area are illustrated in FIGURES 19 to 28. FIGURE 19 shows two loading areas 43 and 44 at the right and left of the driver's seat 34. FIGURE 20 shows a loading area of a full length formed by two floor board sections. FIGURE 21 shows three floor board sections 45, 46, and 47 covering the rear half of the available floor space. The individual board sections either according to FIGURE 20 or FIGURE 21 may also be combined into one larger element. In FIGURE 22, two full-length sections are applied at both sides of the driver's seat. FIGURE 25 shows a floor construction in which only individual floor boards are used which cover the entire floor except the area required for the driver's seat. Such a vehicle is especially adapted to be used as a delivery car. The same applies to the construction according to FIGURES 23 and 27. In FIGURE 23, the rear half of the floor space is covered by a larger board 48 of a width of three individual sections, while in FIGURE 27, two boards 49 and 50 of a size and shape different from the individual sections as previously described cover the entire floor space except the area required for the driver's seat. FIGURES 24, 26, and 28 show different possibilities of covering the entire floor space if it is to be used while the car is not being driven, for example, for camping purposes. In FIGURE 24, three full-length board sections are applied side-by-side, in FIGURE 26, three individual sections cover up only the front half of the floor space and a single board of triple width covers up the entire rear half of the floor, while in FIGURE 28, only two of the last-mentioned wider boards cover up the entire floor space.

Although my invention has been illustrated and described with reference to the preferred embodiments thereof, I wish to have it understood that it is in no way limited to the details of such embodiments or to the particular size, shape, position, and arrangement of the available loading surfaces and repositories or to the particular division of the available floor space or the number and shape of the floor board sections for partly or fully covering the same, but that the invention and its individual features are capable of numerous modifications within the scope of the appended claims.

Having thus fully disclosed my invention, what I claim is:

1. In a passenger car, the combination of a lower frame having wheels, a car body on said frame having front and rear parts substantially symmetrical to each other about a central vertical transverse plane of said car, said car body enclosing a passenger compartment having a substantially level floor adapted to support movable loads along its entire extent, said body comprising front and rear windows and a substantially flat horizontal car top, side walls forming an upper frame enclosing said windows and supporting said car top only at points directly adjacent to said windows, at least one of said side walls having a door opening therein of a length substantially equal to the length of said floor and of a height substantially equal to the vertical distance between said floor and said car top, said door opening extending substantially symmetrically toward both sides of said central plane, at least one door for opening and closing said door opening, said car top having an upper surface for directly supporting movable loads along its entire extent and having outwardly projecting edge portions extending along and protruding over at least said side walls intermediate said front and rear windows and over said door opening and said door when in the closed position, an engine mounted substantially within an area outside of the wheel base of said car, removable seats within said compartment, the total area of said floor and said car top adapted to support movable loads amounting to substantially two-thirds of the total area of said car as seen in a plan view.

2. A passenger car as defined in claim 1, further comprising additional repositories within said passenger compartment having a size so that the total area of said floor, said car top, and the supporting surfaces of said repositories adapted to support movable loads amounts to considerably more than two-thirds of the total area of said car as seen in a plan view.

3. A passenger car as defined in claim 1, having normally two rows of said removable seats, the floor surface adapted to receive each of said seats being substantially level and having a width equal to the width of said seat so that, if at least one of said seats is removed, the entire free floor section then formed will be substantially level.

4. A passenger car as defined in claim 1, further comprising steering means in the front part of said compartment and centrally thereof, said level floor being divided into six substantially equal rectangular sections each adapted to carry movable loads when the seat on said section is removed.

5. A passenger car as defined in claim 2, further comprising a plurality of floor boards each adapted to be mounted on a section of said floor having a width corresponding to the width of at least one of said seats when said seat is removed from said floor section, and adapted to be exchanged for each other.

6. A passenger car as defined in claim 5, in which each of said floor boards consists of a substantially rigid light material.

7. A passenger car as defined in claim 5, in which each of said floor boards consists of a plurality of interconnected means designed so as to be rolled up in one direction.

8. A passenger car as defined in claim 5, in which all of said floor boards are of a size and shape so that, when mounted on said floor, they will together completely cover said floor and form a single substantially flat horizontal surface adapted to support movable loads.

9. A passenger car as defined in claim 5, in which at least one of said floor boards covers approximately one-half of the entire area of said floor.

10. A passenger car as defined in claim 5, in which at least one of said floor boards has a width approximately equal the width of said floor and covers approximately the rear half of the area of said floor.

11. A passenger car as defined in claim 5, in which two of said floor boards are adapted to cover the entire area of said floor and to form a substantially level surface for supporting movable loads.

12. A passenger car as defined in claim 5, in which at least one of said floor boards has a length equal to the full length of said floor and covering one half of the total area of said floor.

13. A passenger car as defined in claim 5, in which at least one of said floor boards has a length equal to the full length of said floor and covering one third of the total area of said floor.

14. A passenger car as defined in claim 5, in which all of said floor boards have a length equal to the full length of said floor.

15. A passenger car as defined in claim 5, further comprising projections on the wall portions surrounding said floor for supporting said floor boards thereon.

16. A passenger car as defined in claim 5, further comprising projections on said floor extending transversely thereof for supporting said floor boards.

17. A passenger car as defined in claim 1, further comprising shelflike surfaces mounted on said door and having a length substantially equal to the length of said door.

18. A passenger car as defined in claim 17, in which said shelflike surfaces are disposed within said door and are accessible from said compartment and have a substantially troughlike shape.

19. A passenger car as defined in claim 1, further comprising shelflike surfaces within said compartment directly underneath at least one of said windows.

20. A passenger car as defined in claim 1, further comprising additional supporting surfaces for baggage and the like, one of said surfaces being disposed in front of and within a plane above one wheel axle of said car, and the other surface being disposed within a plane and area substantially above the other wheel axle.

21. A passenger car as defined in claim 1, further comprising additional substantially level supporting surfaces on said side walls including said door, and further directly underneath said front and rear windows, and further in front of and within a plane above one wheel axle of said car, and further within a plane and area substantially above the other wheel axle, the total area of said floor, said car top, and all of said additional supporting surfaces adapted to support movable loads and having a size amounting to substantially the size of the total area of said car as seen in a plan view.

22. A passenger car as defined in claim 1, in which said door opening has a shape substantially defined by a circle narrowed down by two horizontal secants disposed at the level of the lower edge of said car top and the level of the sill of said door opening, said circle having a diameter substantially equal to two-thirds of the wheel base of said car.

23. A passenger car as defined in claim 1, in which said protruding edge portions of said car top extend around said entire car top and have a substantially triangular cross section.

24. A passenger car as defined in claim 1, in which said protruding edge portions of said car top have a substantially triangular cross section, and further comprising means on said edge portions for securing movable loads in a fixed position on said car top.

25. A passenger car as defined in claim 24, in which said means comprise socketlike means on and within said edge portions for the insertion therein of rods, racks, railings, and the like to project upwardly of said car top.

26. A passenger car as defined in claim 1, in which said protruding edge portions of said car top also project slightly above the adjacent parts of said car top so as to form a rim along at least each lateral side of said car top, and means on said edge portions for securing movable loads in a fixed position on said car top and inwardly of said rims.

27. A passenger car as defined in claim 1, in which said door has a size substantially equal to the size of said door opening, and further comprising means for opening said door by first moving said door outwardly and out of said door opening and by then sliding said door in a direction substantially parallel to the longitudinal axis of said car so as substantially to uncover said door opening.

References Cited in the file of this patent

UNITED STATES PATENTS

| | | |
|---|---|---|
| 456,384 | Scott | July 21, 1891 |
| 983,992 | Gordon | Feb. 14, 1911 |
| 1,204,523 | Watts et al. | Nov. 14, 1916 |
| 1,495,026 | McGee | May 20, 1924 |
| 1,694,855 | Irons | Dec. 11, 1928 |
| 2,128,930 | Fageol | Sept. 6, 1938 |
| 2,527,487 | Paton | Oct. 24, 1950 |
| 2,564,988 | Muller | Aug. 16, 1951 |
| 2,798,445 | Gehman | July 9, 1957 |

FOREIGN PATENTS

| | | |
|---|---|---|
| 244,356 | Great Britain | Dec. 17, 1925 |
| 333,734 | Italy | Jan. 10, 1936 |
| 678,422 | Great Britain | Sept. 3, 1952 |
| 806,516 | France | Sept. 28, 1936 |
| 1,059,830 | France | Nov. 18, 1953 |